Figure 1:
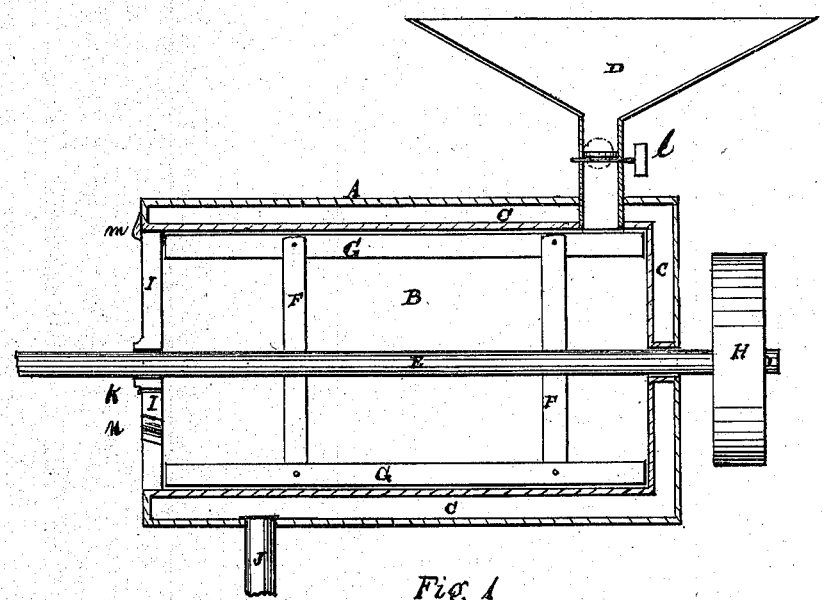

G. W. WAITT.
Grain Dryer.

No. 112,518.

Patented Mar. 7, 1871.

Witnesses.
J. F. Colby
Robt. E. Smith

Inventor.
Geo. W. Waitt
By D. C. Colby & Son
Attorneys

UNITED STATES PATENT OFFICE.

GEORGE W. WAITT, OF PHILADELPHIA, PENNSYLVANIA, ASSIGNOR TO HIMSELF AND ROBERT B. FITTS, OF SAME PLACE.

IMPROVEMENT IN WHEAT-ROASTERS.

Specification forming part of Letters Patent No. 112,518, dated March 7, 1871.

*To all whom it may concern:*

Be it known that I, GEORGE W. WAITT, of Philadelphia, in the county of Philadelphia and State of Pennsylvania, have, as I believe, invented a new Mode of Roasting, and new and useful Improvements in Apparatus for Roasting Wheat and other Grain; and I do hereby declare the following to be a full and exact description of the same, reference being had to the drawing that accompanies and forms part of this specification.

The object of my invention is to provide a means of roasting wheat, corn, or other grain, in a manner and with such apparatus as shall admit of a wide range of heat and yet not scorch the berries, and produce a palatable and wholesome food of all the elements of the grain—the starch, the gluten, and the phosphates.

My invention consists, in part, in construction of oven, and mode of arranging and operating certain parts to secure uniformity of roasting, as specified.

And, further, my invention consists in suitable devices for supplying a free circulation of air through the roasting-chamber during the first part of the roasting process, and also for closing out the air during the latter part of said process, in order that the aromatic or desirable oils may not be driven off.

To these ends I surround my roasting-chamber with a steam-chest, that no kernel may be charred, and provide said chamber with suitable means for stirring its contents, and for letting in air, and also for closing out air, as hereinafter set forth.

Figure 2:
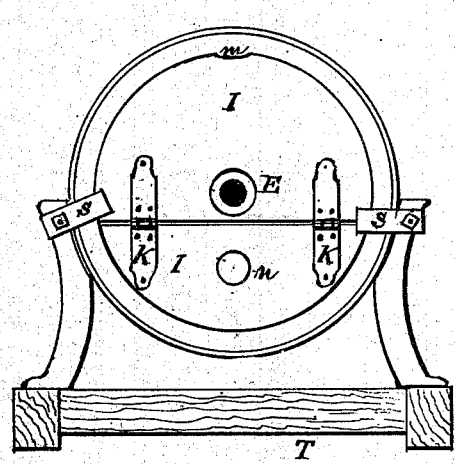
Figure 3:
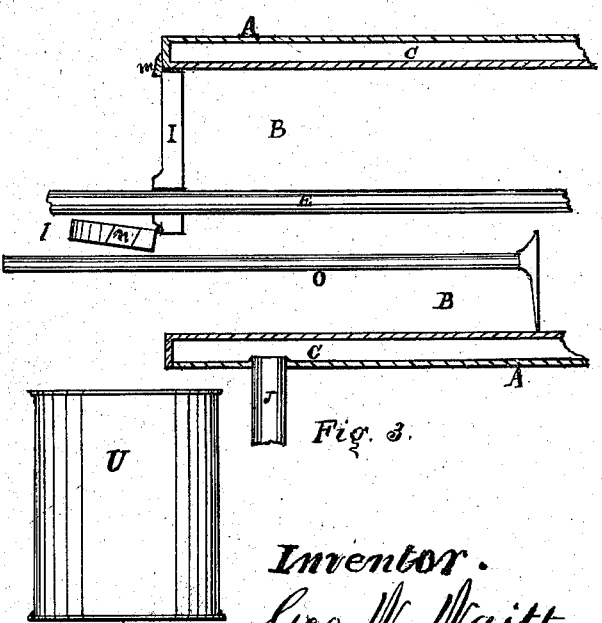

Figure 1, a longitudinal section of steam-chest and roasting-chamber, exhibiting the parts within; Fig. 2, end view, with detachable head to the roasting-chamber; Fig. 3, a part longitudinal section, presenting the lower portion of said detachable head swung up on hinges.

Letter A represents a steam-chest, which should be of sufficient strength to sustain one hundred and forty pounds to the square inch; B, a cylindrical chamber, inserted in the steam-chest so as to be entirely surrounded by steam, save the space occupied by the detachable head hereinafter described; C, a space between cylinders A and B, in which steam is always present; D, a funnel, through which the grain is fed to chamber B; E, a shaft through the center of chamber B; F, arms arranged upon the shaft E, extending in opposite directions, (see Fig. 1;) G, slats attached to the arms F, substantially as represented, their object being to keep the wheat stirring; H, a pulley on one of the outer ends of shaft E; I, detachable head to roasting-chamber B, the lower portion hung upon hinges, so as to swing up, as in Fig. 3; J, supply-steam pipe; K, hinges joining the two parts of the head I; $l$, a damper in furnace, D for regulating the flow of air from chamber B during the roasting process; $m$, a lip extending slightly downward, and keeping in position the upper edges of head I; $n$, an opening in the lower part of head I, serving not only to allow the ingress of air when desired, but also to allow a spoon or the like to be inserted, for testing the condition of the grain; O, a draw-shovel, by which the grain in chamber B may be removed when sufficiently roasted. (For indications of the method of using this, see Fig. 3.) S S, buttons, acting, in conjunction with lip $m$, to keep the head I in place. These may be turned up, as the one on the right of Fig. 2, to allow the lower part of head I to be swung up, as in Fig. 3; and when the head I is, for any reason, to be removed, these buttons may be turned still farther up, so as to entirely clear it. T, the top of a frame upon which the apparatus is supposed to rest; U, a vessel to receive the wheat or other grain as it is drawn from chamber B.

In carrying out my invention, having provided for sufficient steam to supply the heat, so that the temperature in chamber B may be gradually carried up to 250° to 280° Fahrenheit, I introduce the grain through the funnel D, filling the chamber a fourth to a half full. While the roasting is going on the shaft E is kept in constant rotation, carrying around with it the arms F and the slats G, which keep the grain in continued motion, that all may be equally affected by the heat.

If the grain should be found to do faster at one end of the chamber than the other, the slats or wings G may be so constructed as to keep up a change of said grain from end to end, to remedy the said defect.

A roasting sufficient to change a portion of the starch to dextrine and to render the hull friable, disengaging the gluten, should be secured. Experience will teach the extent to which the process should be carried, as the time required will vary according as heat is more slowly or more rapidly supplied to chamber B.

During the first part of the roasting process it is desirable to have a free circulation of air through the chamber containing the grain, not simply to aid evaporation, but as the best of all possible means to carry off all want of sweetness in the grain, all approaches to moistness or mold. For this the opening $n$ in the head I and the upward passage through the funnel D will be sufficient.

Toward the latter part of the roasting process the damper $l$ should be closed, or nearly so, and the opening $n$ also, as otherwise some of the desirable and palatable qualities afforded by the oils in the grain would be lost.

A proper steam-gage and drip, as well as all necessary parts for regulating and controlling the steam and heat of chamber B, should be supplied.

After the wheat has been withdrawn from chamber B and thoroughly cooled, it may be put up for commercial and family use, either in the whole kernel, or more or less comminuted.

By this treatment the entire grain is fitted for easy digestion, and is most wholesome and nutritious food, for the healthy as well as for invalids, supplying the elements to make fuel and fat for the system, also good blood and muscle; and, furthermore, what fine flour does not, supplies the bone-producing elements— the phosphates.

As my invention, I claim—

The apparatus hereinbefore described for roasting the grain—that is, the steam-chest A, chamber B, and rotating shaft E, with stirring parts F and G, arranged and combined substantially as and for the purposes specified.

In testimony whereof I have signed my name to this specification in the presence of two subscribing witnesses.

GEO. W. WAITT.

Witnesses:
CHAS. C. WAITT,
EDWARD G. LEE.